United States Patent
Kacmarcik et al.

[15] 3,667,663
[45] June 6, 1972

[54] FEEDER UNIT

[72] Inventors: Thomas J. Kacmarcik, Parma Heights; Robert K. Norton, Twinsburg, both of Ohio

[73] Assignee: Harris-Intertype Corporation, Cleveland, Ohio

[22] Filed: Mar. 13, 1970

[21] Appl. No.: 19,221

[52] U.S. Cl. ........................................................ 225/100
[51] Int. Cl. ..................................... B26f 3/00, B65h 35/00
[58] Field of Search ........................... 198/34, 76; 225/100, 3

[56] References Cited

UNITED STATES PATENTS 2,655,842   10/1953   Baumgartner ...................... 225/100

Primary Examiner—Richard E. Aegerter
Attorney—Yount and Tarolli

[57] ABSTRACT

An improved apparatus for processing a stream of articles formed from sheet material with the articles arranged in interconnected rows extending transverse to the direction of movement of the articles includes a first means for transporting the articles at a first speed and a second means for receiving the articles from the first means and conveying the articles at a second speed which is in excess of the first speed. The second means for receiving the articles includes a conveyor unit and a plurality of rollers operatively associated with the conveyor unit and each of which have an article conveying position and an inactive position in which the roller does not cooperate with the conveyor to convey the articles. Means are provided for selectively moving at least one of the rollers between its positions so that the one roller may engage with one of the transversely extending rows of articles as the trailing edge of that row of articles passes from the first means. The one row of articles is then speeded up relative to the next successive row of articles which is engaged with the first means to thereby disconnect the one row from the next row of articles to thereby space the one row of articles relative to the next successive row of articles so as to facilitate processing of the articles as they move through the apparatus. The selective operation of the one roller enables the apparatus to process articles having a wide variety of configurations.

7 Claims, 6 Drawing Figures

INVENTORS
THOMAS J. KACMARCIK
ROBERT K. NORTON
BY
Yount and Tarolli
ATTORNEYS

INVENTORS
THOMAS J. KACMARCIK
ROBERT K. NORTON
BY Yount and Tarolli
ATTORNEYS

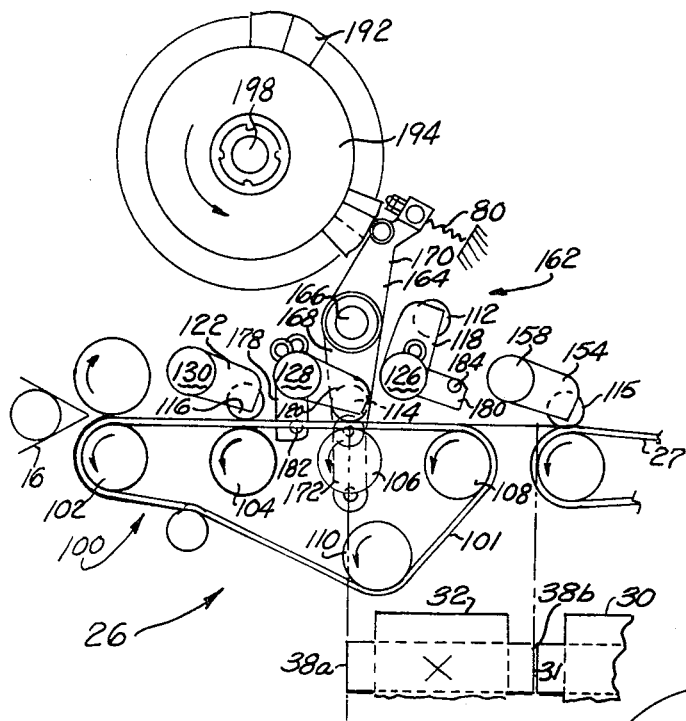
FIG.4
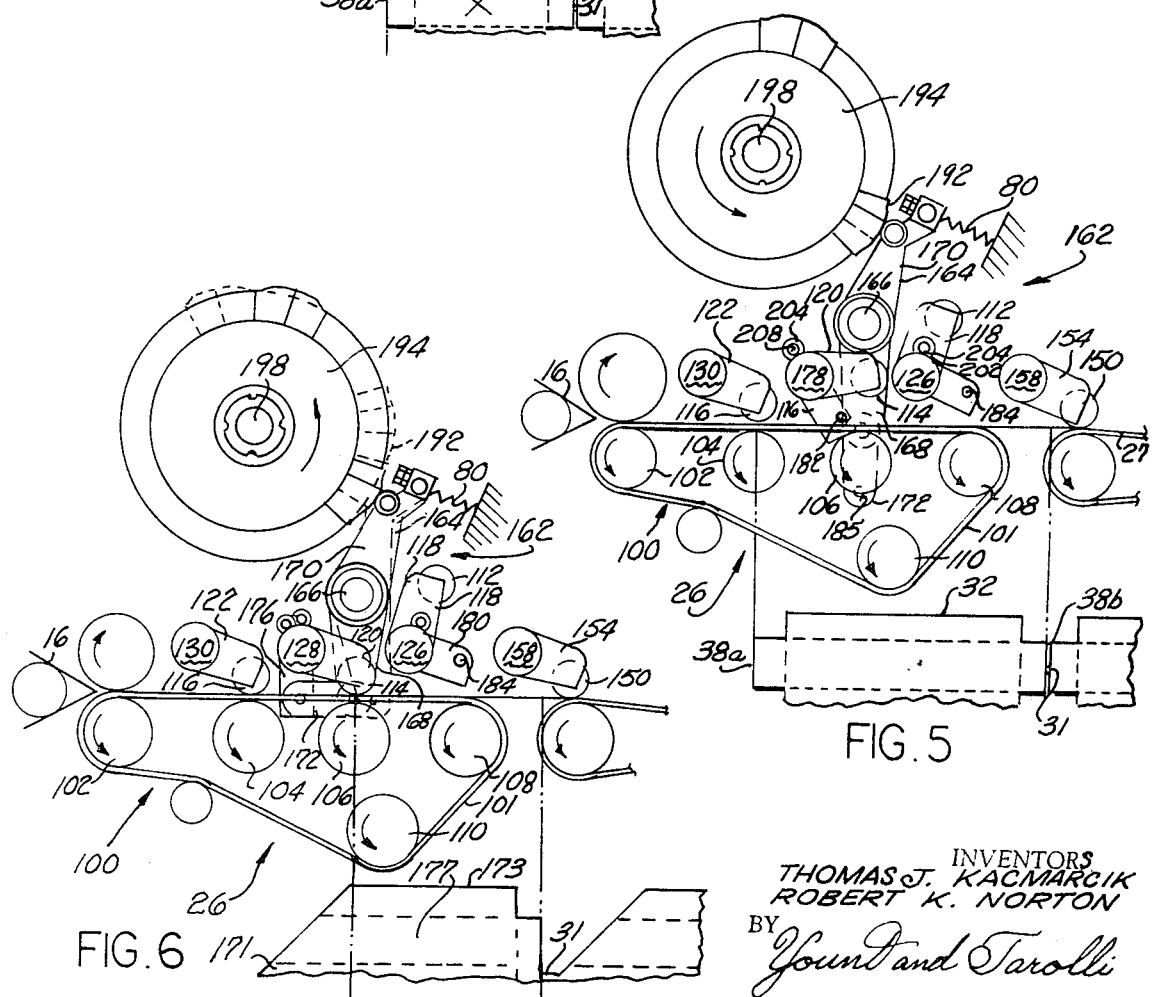
FIG.5
FIG.6
INVENTORS
THOMAS J. KACMARCIK
ROBERT K. NORTON
BY Yount and Tarolli
ATTORNEYS

FEEDER UNIT

The present invention relates to an apparatus for processing a stream of articles arranged in a plurality of rows which extend transverse to the direction of movement of the articles, and more specifically, to means for separating the rows of articles so as to facilitate processing of the articles.

Known prior art apparatus for separating rows of articles which extend transverse to the direction of movement of the articles utilize complex and costly mechanisms for separating the rows of articles. One of these mechanisms includes rollers which speed up one row of articles relative to another row of articles so as to separate the rows of articles. The rollers are adjustable along the path through which the articles move so as to enable the rollers to separate articles having lengths which vary from job to job. This construction has associated therewith the disadvantage that the drives for the rollers must also be adjustable and, accordingly, are complex and expensive. Moreover, such known machines also suffer from the disadvantage that articles which have uneven or offset lead edges are often skewed due to the fact that the rollers speed up one side of the article relative to the other side of the article when the rollers do not simultaneously engage with the entire lead edge of the article.

Accordingly, an object of the present invention is to provide a new and improved apparatus for processing a plurality of articles which overcomes the hereinabove disadvantages by providing a simple low cost mechanism for separating rows of articles which extend transverse to the direction of movement of the articles and which is operable to separate rows of articles of various lengths and rows of articles having an uneven lead edge without skewing the articles.

The preceding object is accomplished by providing a speed up roller or a plurality of speed up rollers spaced along the path of movement of the articles which cooperate with a conveyor to speed up one transversely extending row of articles relative to the next successive transversely extending row of articles to thereby separate the rows of articles. The rollers each have an article conveying position and an inactive position in which the roller does not cooperate with the conveyor to speed up a row of articles relative to the next successive row of articles. Means are provided for positioning certain selected speed up rollers to one or the other of their positions so that different length articles may be separated. Means are associated with at least one of the speed up rollers for selectively moving the one roller between its positions as rows of articles move thereby to enable the one roller to intermittently engage with the articles so that articles having offset lead edges may be speeded up without skewing the row of articles.

Another object of the present invention is to provide a new and improved apparatus for processing a plurality of articles which are arranged in rows which extend transverse to the direction of movement of the articles comprising first means for transporting the articles at a first speed, second means for receiving the articles from the first means and conveying the articles at a speed in excess of the first speed and including a plurality of speed up rollers engageable with the articles with at least one of the rollers having an article conveying position in which the roller cooperates to speed up and convey a row of articles and an inactive position in which the roller does not cooperate to convey the articles, and means for selectively moving the one speed up roller between its positions to enable the one roller to intermittently engage with one of the rows of articles as the trailing edge of the row passes from the first means so as to speed up the one row of articles relative to the next succeeding row of articles which is engaged with the first means to thereby effect a spacing between the one row of articles and the next successive row of articles.

A further object of the present invention is to provide a new and improved apparatus for processing articles as noted in the next preceding paragraph wherein the means for selectively moving the one roller between its positions includes a linkage operatively associated with the one roller for moving the roller between its positions and cam means which move in a timed relationship with the movement of the articles through the apparatus and which effect movement of the linkage to thereby enable the roller to speed up and separate rows of articles having offset lead edges without skewing the articles and enable the plurality of rollers to speed up and separate successive rows of articles having different lengths.

A still further object of the present invention is to provide a new and improved apparatus for processing a plurality of articles comprising a pair of cooperable cylinders for cutting sheet material into waste and articles which are arranged in rows which extend transverse to the direction of movement of the articles, stripper means for stripping the waste material from the articles, means for separating the transversely extending rows of articles, classifying means for directing a first row of articles into a first path and a second row of articles into a second path, skewing conveyor means for receiving the articles from the classifying means and laterally separating the articles in the transversely extending rows and wherein the means for separating the transversely extending rows of articles comprises a second means for conveying the articles including a conveyor means and a plurality of rollers at least one of which is selectively movable between an inactive position and an article conveying position in which it cooperates with the conveyor means to engage a row of articles and increasing the speed of that row of articles relative to the next successive row of articles so that the one row of articles becomes spaced from the next successive row of articles.

Still another object of the present invention is to provide a new and improved apparatus for processing a plurality of articles as noted in the next preceding paragraph further including cam means for selectively moving the one roller between its positions to thereby enable the apparatus to process articles of different lengths and articles having offset lead edges.

Further objects and advantages of the present invention will become apparent from the following detailed description of a preferred embodiment of the present invention made in conjunction with the accompanying drawings forming a part of the specification and in which:

FIG. 4 is a schematic representation of the means for separating the articles and illustrating the apparatus separating articles and schematically showing the articles;

FIG. 5 is a schematic representation similar to FIG. 4 illustrating operation of the apparatus when the apparatus processes long articles and schematically showing the long articles; and FIG. 6 is a schematic representation similar to FIG. 4 showing the apparatus processing articles having misaligned or offset lead edges and schematically illustrating the articles.

The present invention relates to a new and improved apparatus for processing a stream of articles formed from sheet material with the articles arranged in rows extending transverse to the direction of movement of the articles and more particularly, to the means for separating the transversely extending rows of articles so that the different rows of articles may be directed to different means for receiving the articles. The preferred embodiment of the present invention is to be described hereinbelow is especially adapted for use in the formation of carton or box blanks from sheet material and is of a construction which provides for extremely high speed and reliable operation and is easily adjustable so that the mechanism may handle many different types of articles, such as carton or box blanks.

Figure 1:
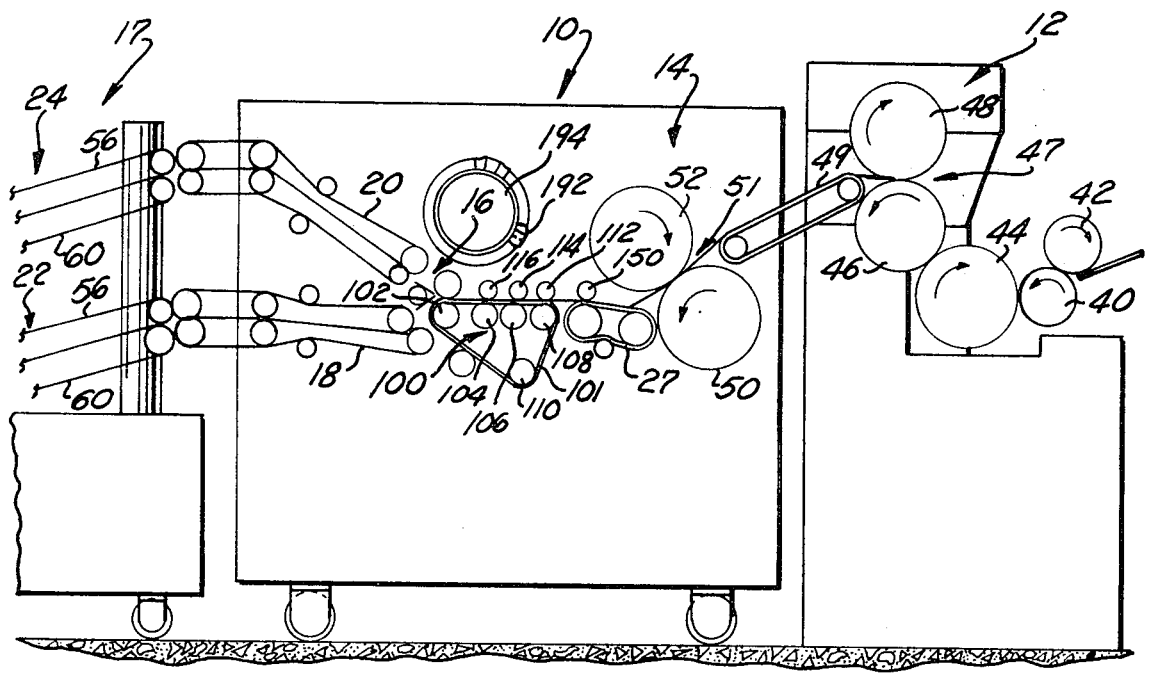
FIG. 1 is a schematic side elevational view of an apparatus for processing a plurality of articles embodying the present invention.

As representing a preferred embodiment of the present invention, FIG. 1 illustrates an improved apparatus 10 for processing a stream of articles made of sheet material and arranged in rows extending transverse to the direction of movement of the articles. The apparatus 10 includes, in general, a cutting and creasing unit 12 in which sheet material is cut and creased into carton blanks and waste material. The material cut into carton blanks and waste material is delivered from the cutting and creasing unit 12 into a separator unit 14. The separator unit 14 is operable to separate the carton blanks and the waste and deliver the carton blanks to a first means for conveying the articles which comprises a transfer conveyor 27. The transfer conveyor 27 transfers the articles to the means 26 for separating the transversely extending rows of articles which delivers the articles to an article classifying means 16. The article classifying means 16 classifies the articles and directs the articles to the first means for receiving the articles 20 and the second means for receiving the articles 18. The first and second means for receiving the articles directs the articles to a skewing conveyor unit 17 which laterally separates the articles which are cut from the material and delivers the articles to a shingling and stacking unit which is not illustrated. The shingling and stacking unit is operable to shingle the carton blanks and stack the carton blanks for removal from the apparatus in a well-known manner.

Preferably, the sheet material which is processed by the apparatus 10 is cardboard sheet material having an outline of a plurality of carton blanks printed thereon in closely spaced relationship and lying in rows on the material with each row extending transverse to the feed of the material. The sheet material is thus cut providing a plurality of carton blanks spaced immediately adjacent to each other in interconnected rows and the sheets are fed through the apparatus in this manner. The sheet material is so dimensioned that a plurality of rows of carton blanks are cut from each sheet.

Figure 2:
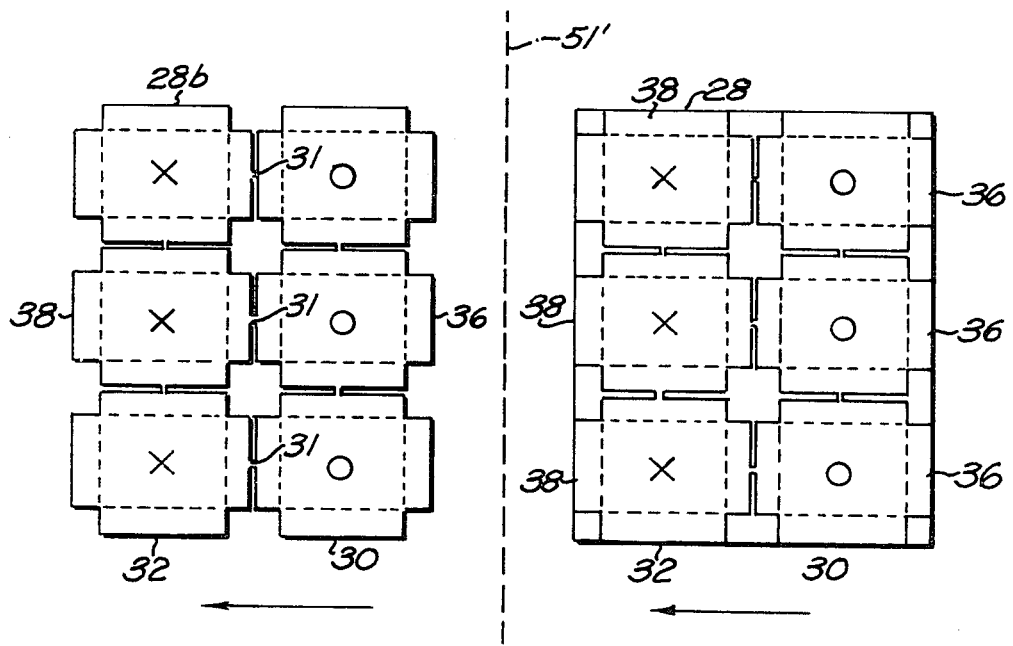
FIG. 2 is a schematic representation of a sheet of articles showing the sheet before and after it passes through the stripping unit.

A portion of the sheet which is to be processed by the apparatus 10 is shown in FIG. 2. When a sheet 28 is fed into the cutting unit 12, it has a plurality of images printed thereon such as the X and O images illustrated in FIG. 2. The printed sheet is fed between a pair of rollers 40 and 42 which cooperate to direct the sheet to a transfer roll 44. The transfer roll 44 includes suitable gripper means thereon which engage with the sheet and direct the sheet from the rolls 40 and 42 to the cutting and creasing unit 12.

The cutting and creasing unit 12 comprises a pair of cutting and creasing rolls 46 and 48 which rotate adjacent each other at substantially the same surface speed. The cutting roll 46 includes suitable grippers thereon which engage with the sheet as it passes from the transfer roll 44 to thereby direct the sheet through a cutting nip 47 which is located between the pair of cutting and creasing rolls 46 and 48. As the sheet passes through the cutting nip 47, the cutting and creasing rolls 46 and 48 cooperate to cut and crease the sheets 28 as they pass therebetween in a well-known manner.

A sheet 28 which has been cut and creased by the cutting and creasing unit 12 as it passes through the cutting and creasing nip 47 comprises two rows 30 and 32. The rows 30 and 32 each contain a desired number of carton blanks such as the blanks 36 having O printed thereon and the blanks 38 having X printed thereon. The blanks 36 which are disposed in the row 30 of the sheet 28 are all blanks of the same type and the blanks 38 which are disposed in the row 32 of the sheet 28 are all blanks of the same type. The blanks 36 and 38 may preferably be different types of cartons or have different images printed thereon such as the X and O images illustrated in FIG. 2.

After the sheets are cut and creased by the cutting and creasing unit 12, the sheets are then transferred by a conveyor 49 to a stripper unit 14 which is operable to separate the waste material from the articles. The stripper unit 14 includes a pair of rotary cylinders 50 and 52 which cooperate to effect a separation of the carton blanks and waste delivered thereto. The cylinders 50 and 52 rotate adjacent each other and define a stripping nip 51 therebetween. The position of the stripping nip 51 is schematically illustrated by the phantom line 51' in FIG. 2. The rotary cylinders 50 and 52 which cooperate to separate the articles and the waste material are the same size as the cutting and creasing cylinders 46 and 48 and are driven at substantially the same surface speed. The cylinders 50 and 52 operate to separate the waste material from the carton blanks in a well-known manner and are more fully described in the Sarka U.S. Pat. No. 3,410,183, issued Nov. 12, 1968, and assigned to the same assignee as the present invention. As the articles pass from the stripper unit 14, the sheet has a configuration similar to the configuration of the sheet 28b and the transversely extending rows 30 and 32 of articles are preferably held together by tabs or nicks 31 which are easily broken to separate the rows of articles.

A means 26 for separating the articles is operable to separate the rows 30 and 32 by breaking the nicks 31 which connect the rows and then transfer the separated rows of articles to the article classifying means 16. The article classifying means 16 is operable to direct the rows 30 and 32 of articles 36 and 38, respectively, to either the first means for receiving the articles which comprises the transfer conveyor unit 20 or the second means for receiving the articles which comprise the transfer conveyor 18. If it is desired the article classifying means 16 may direct only the rows 32 of articles 38 to the transfer conveyor unit 20 and only the rows 30 of the articles 36 to the transfer conveyor unit 18. In this manner the articles may be classified into their respective classes.

As noted hereinabove, the carton blanks which are cut from the sheet material are located immediately adjacent to each other in a side-by-side relation. As shown in FIG. 2 the rows 30 and 32 are arranged so that there is no lateral separation of the carton blanks due to the operation of the stripper unit 14 and the conveyor 27, and, therefore, the carton blanks are received by the skewing conveyor 17 in a close, laterally spaced relation. The skewing conveyor 17 includes a lower skewing unit 22 and an upper skewing unit 24 each of which is operable to separate the carton blanks laterally so that the carton blanks may be readily and easily shingled and stacked without interference between adjacent carton blanks.

The skewing conveyor unit 17 includes an upper tier of skewing conveyors 24 for receiving carton blanks from the upper conveyor unit 20 and a lower tier of skewing conveyors 22 for receiving carton blanks from the conveyor unit 18. The upper and lower tiers of conveyors 22 and 24 each include a plurality of upper tape conveyors 56 and a plurality of lower tape conveyors 60. The upper side of the carton blanks are engaged by the plurality of upper tape conveyors 56 and the lower side of the carton blanks are engaged by the plurality of lower tape conveyors 60. The tape conveyors 56 and 60 have a fan-like configuration which is not illustrated but which is well-known in the art so that as the articles pass therealong, the articles engage with the tapes which cooperate to break the tabs or nicks which hold the articles in their respective transversely extending rows to thereby laterally separate the articles. This lateral separation of the articles and the construction of the skewing conveyor 17 is more fully described in the Sarka U.S. Pat. No. 3,410,183.

Preferably, a shingling and stacking unit such as the shingling and stacking unit disclosed in the Sarka U.S. Pat. No. 3,410,183 is operable to receive the carton blanks from the skewing conveyor unit 17. The shingling and stacking unit shingles the carton blanks and stacks the carton blanks for removal from the apparatus. The operation of the shingling and stacking unit is well-known in the art and, therefore, has not been illustrated.

The means 26 for separating the rows of articles includes a second means for conveying the articles which is a conveyor 100 which is operable to receive the articles as they pass from the conveyor 27. The conveyor 100 includes a conveyor belt 101 which extends around the rollers 102, 104, 106, 108 and 110 and is suitably driven thereby at a second speed which is in excess of the first speed at which the conveyor unit 27 is driven. A plurality of speed up or pinch rollers 112, 114, and 116 are located above the conveyor 100 and are operable to engage with the upper side of the articles when the articles pass along the conveyor belt 101. The speed up or pinch rollers 112, 114 and 116 pinch the articles into engagement with the conveyor belt 101 so that the articles are brought up to the speed of the conveyor 100. This causes the nicks 31, which are located between the transversely extending rows of articles, to be broken due to the fact that while one of the transversely extending rows of articles is engaged with the conveyor unit 100 and the pinch rolls, the other rows of articles are engaged with the conveyor unit 27 and the stripping unit 14, both of which move at a slower surface speed than the conveyor 100.

Figure 3:
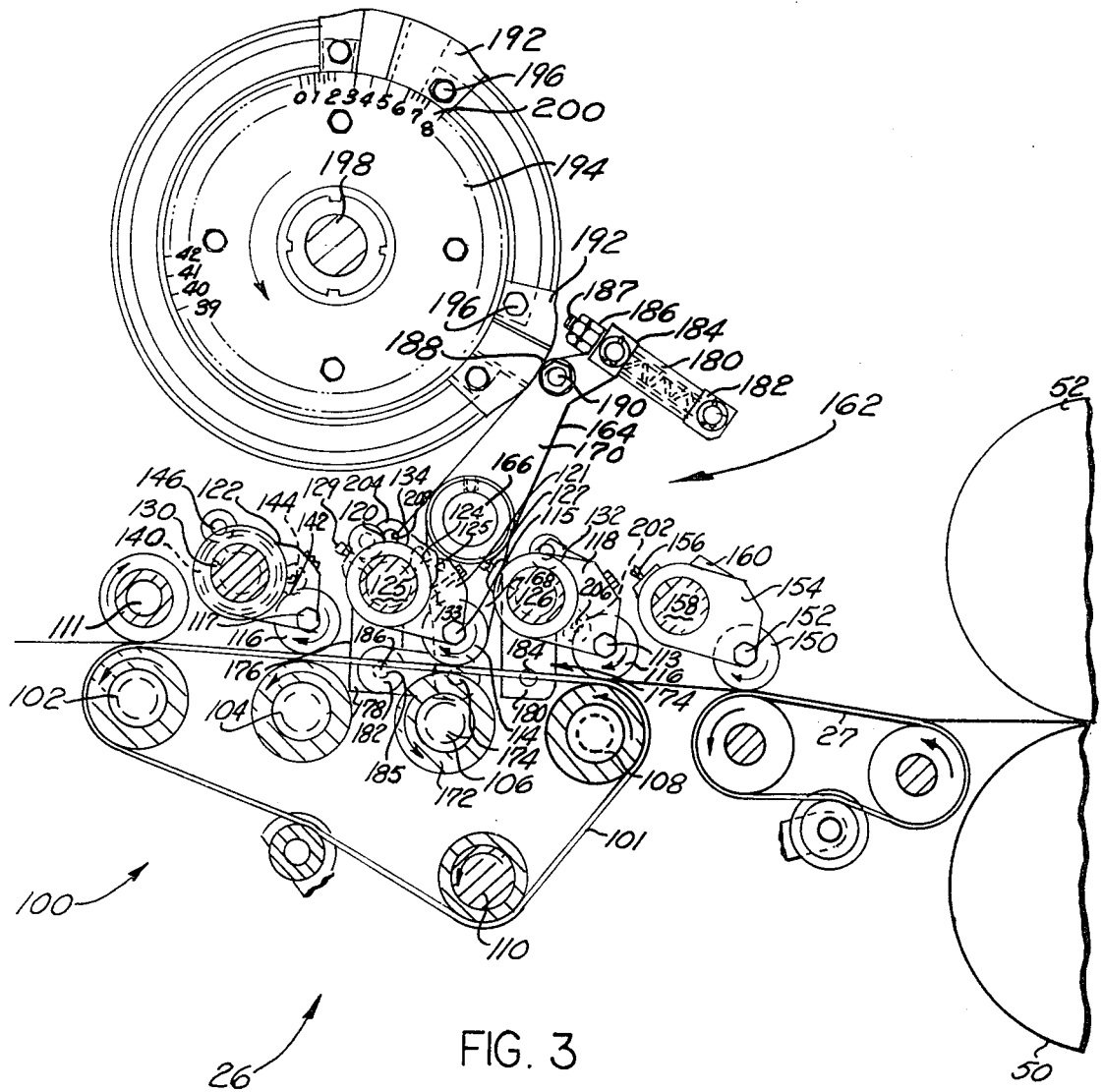
FIG. 3 is an enlarged side elevational view of the means for separating the transversely extending rows of articles.

The speed up or pinch rollers 112, 114 and 116 are supported for rotation about to the shafts 126, 128 and 130, respectively, as illustrated in FIG. 3. The pinch roll 112 is rotatably supported on a shaft 113 which is supported by a bracket 118 through which the shaft 126 extends. The pinch roll 114 is rotatably supported on a shaft 115 which is supported by a bracket 120 through which the shaft 128 extends. Thus, it should be apparent that the pinch rolls 112 and 114 are supported by the brackets 118 and 120 and rotation of the brackets effects rotation of the pinch rolls about the longitudinal axis of the shafts 126 and 128 respectively.

The pinch roll 116 is rotatably supported upon a shaft 117 which is supported by a bracket 122 which is supported upon the shaft 130. Rotation of the shaft 130 will effect rotation of the bracket 122 and the pinch roll 116 as are fully described hereinbelow. The pinch roll 116 is illustrated in FIG. 3 in its article conveying position in which it pinches the articles which move along the conveyor belt 101 to thereby bring the articles to the speed of the conveyor belt 101. Rotation of the shaft 130 in a counterclockwise direction will rotate the bracket 122 away from the conveyor belt 101 to move the pinch roll 116 to its inactive position in which the pinch roll is not operable to engage with the article moving along the conveyor belt 101.

A bracket 140 is rigidly attached to the shaft 130, so that rotation of the bracket effects rotation of the shaft 130. The bracket 140 includes an arm 142 thereon having the opening 144 therein. Suitable means may be provided to engage the arm 142 of the bracket 140 and effect rotation of the bracket 140 and the shaft 130. Disposed adjacent to the bracket 140 is an opening 146 which may be provided in the frame of the apparatus. When the bracket 140 is rotated so that the opening 144 therein is disposed adjacent to the opening 146 in the frame of the press, a suitable pin may be inserted through the openings 144 and 146 to secure the bracket 140 in its rotated position and to thereby hold the pinch roller 116 in its inactive position. Thus, it should be apparent that the pinch roll 116 can be locked into its inactive position by a pin being inserted through the openings 144 and 146 when the bracket 140 has rotated the shaft 130 in a counterclockwise direction so that the opening 144 therein is aligned with he opening 146 in the mechanism. The speed upon pinch roll 116 may also be locked in its active or article conveying position by rotating the bracket 140 to its position illustrated in FIG. 3 so that the opening 144 is disposed adjacent another opening, not illustrated, located in the frame of the press. A suitable pin may be inserted through the opening 140 into the other opening to thereby lock roller 116 in its article conveying position much in the same manner as the roller is locked in its inactive position.

The pinch rollers 112 and 114 also have article conveying positions in which the pinch rollers engage with an upper portion of the article as the article passes along the conveyor belt 101 and an inactive position in which the pinch rollers are inoperable to engage with the article as the article passes along the conveyor belt 101. Each of the pinch rollers 112 and 114 is biased to its article conveying position when the shaft 126 or 128 associated therewith is disposed in a predetermined angular position. A spring 124 is supported by a bracket 134 which is secured to the shaft 128 for rotation therewith by a key assembly 129. The bracket 134 includes a shoulder portion 135 thereon upon which one end of the spring 124 is supported. The other end of the spring 124 is disposed against a shoulder portion 121 located on the bracket 120. The spring 124 is an expansion spring and exerts a force against the shoulder 121 to the bracket 120 in a clockwise direction about the shaft 128 to thereby provide a resilient force which biases the pinch roller 114 into engagement with the conveyor belt or the articles which may be disposed thereon. The pinch roller 112 has a similar spring, no illustrated, disposed between a shoulder on the bracket 118 and a bracket 132 which is rigidly keyed to the shaft 126 by the key assembly 127. The spring, while it is not illustrated, works at a fashion which is analogous to the fashion in which the spring 124 biases the bracket 120 about the shaft 128. Thus, it should be apparent that both the pinch rollers 112 and 114 are biased into engagement with the conveyor belt 101 or the articles passing therealong when the shafts 126 and 128, respectively, dispose the pinch rollers in their article conveying positions. The pinch roller 116 also has a spring, not illustrated, which works in a manner analogous to the fashion in which spring 124 works so as to bias the pinch roller 116 into engagement with the conveyor belt 101 when the roller 116 is locked in its article conveying position.

The bracket 120 has an adjustable stop member 125 secured thereto. The stop member is engageable with a stop surface 133 on the bracket 134 and limits the clockwise rotation about the shaft 128 of the bracket 120 and the pinch roller 114. MOreover, when the shaft 128 is rotated in a counterclockwise direction the bracket 134 is also rotated and the stop surface 133 engaged with the stop member 125 to effect rotation of the bracket 120 and the pinch roller 114 in a counterclockwise direction. This moves the roller 114 to its inactive position. The speed up rollers 112 and 116 and their respective brackets 118 and 122 are associated with the brackets 132 and 140, respectively, in a manner which is analogous to the association of the bracket 120, the bracket 134 and the roller 114 so as to enable the rollers 112 and 116 to be moved to an inactive position by rotation of the shafts 126 and 130, respectively.

When one of the pinch rollers engages with the upper portion of the articles as the articles pass along the conveyor belt 101, the pinch roller will bias the articles into engagement with the conveyor belt 101, to thereby bring the articles up to the speed of the conveyor belt 101. This will increase the speed of the article since the articles have been previously traveling at the speed of the conveyor unit 27, which is slower than the speed of the conveyor unit 100.

A pinch roll 150 is also provided adjacent to the conveyor unit 27. The pinch roller 150 is rotatably supported on the shaft 152 which is supported by the bracket 154. The bracket 154 is mounted for rotation about the shaft 158. A bracket 160 is secured to the shaft 158 by a key assembly 156 and includes a spring not illustrated similar to the spring 124 associated with the pinch roller 114 to thereby bias the roller 150 in a clockwise direction into engagement with the conveyor unit 27. The brackets 154 and 160 also include a stop member and stop surface not illustrated similar to the stop surface 133 and stop member 125 associated with the brackets 120 and 134 and which cooperate to effect movement of the pinch roller 150 to its inactive position and limit the clockwise rotation of the bracket 154 about the shaft 158. The pinch roller 150 will thus cooperate to prevent skidding of the articles on the conveyor unit 27 and assure that the articles engaged with the conveyor 27 will travel at the speed of the conveyor unit 27.

The shafts 126 and 128 have brackets 174 and 176 respectively securely affixed thereto which are operable to be engaged by suitable means to rotate the brackets. When the brackets 174 and 176 are rotated in a counterclockwise direction the shafts 126 and 128 will be rotated therewith to move the pinch rolls 112 and 114, respectively, to their inactive positions. The brackets 174 and 176 also include arms 202 and 204, respectively, thereon. The arms 202 and 204 have openings 206 and 208, respectively, thereon for receiving a pin member which is not illustrated. The arms 202 and 204 may be rotated in a counterclockwise direction so as to align the openings 206 and 208 with openings formed in the frame of the machine and a pin may be inserted through either the openings 206 or 208 and through the opening in the frame of the machine to thereby lock the rollers 112 or 114 in their inactive positions. The arms 202 and 204 may also be rotated in a clockwise direction so as to align the openings 206 and 208 with other openings formed in the frame of the machine and likewise a pin may be inserted through the openings 206 or 208 and through the other openings in the frame to thereby lock rollers 112 or 114 in their article conveying position.

It should be apparent that when one row of articles engages with one of the rollers 112, 114 or 116, and the next succeeding transversely extending row of articles is engaged with the pinch roller 150, the pinch rollers 112, 114, 116 will cooperate with the conveyor 100 to speed up the one row of articles which is engaged with the pinch roller 150 and the conveyor 27. Therefore, the nicks 31 which are disposed between the transversely extending rows of articles, will be broken due to the fact that the one row of articles is speeded up relative to the next successive rows of articles. The breaking of the nicks 31, which are disposed between the transversely extending row of articles, will effect a spacing of the transversely extending rows of articles as the rows of articles pass along the conveyor 100. This spacing of the rows of articles enables the article classifying means 16 to move between its positions while a space between two rows of articles is adjacent thereto to thereby direct the articles to either the first or second means 22 or 24 for receiving the articles without disrupting the flow of articles through the apparatus. While a single pinch roll has been illustrated associated with each of the shafts 126, 128, 130 and 158 it should be apparent that preferably a plurality of spaced apart pinch rolls could be mounted on each shaft and all of the pinch rolls associated with each of the shafts would move between their article conveying and inactive positions simultaneously.

In certain situations, it is desired to move either of the pinch rollers 112 or 114 between their article conveying positions and their inactive positions as the rows of articles pass along the conveyor 100. To this end, a linkage means 162 has been provided which is operable to move either of the rollers 112 or 114 between its article conveying and its inactive positions. The linkage 162 includes a link member 164 which is rotatably supported about a shaft 166. The link member 164 includes a pair of arms 168 and 170. The arm 168 is attached to one end of a link 172 by the bolt assembly 175. The link 172 is operable to be attached at its other end to either one of the brackets 174 or 176 which are suitably secured to the shafts 126 and 128, respectively.

The bracket member 174 includes an arm portion 180 thereon which has an opening 184 disposed therein and the bracket 176 includes an arm portion 178 which has an opening 182 disposed therein. The link 172 is attachable to either the arm 178 of the bracket 176 or the arm 180 of the bracket 174. To this end, the link 172 has an opening 185 disposed in one end thereof and through which a pin member 186 may be suitably inserted into either the opening 182 of the bracket 176 or the opening 184 in the bracket 174. It should be apparent that when the pin 186 is disposed in the opening of the link 172 and in one of the openings of one of the brackets 174 or 176, the brackets 174 or 176 will be interconnected with the link 164 so that rotation of the link 164 about the shaft 166 will effect rotation of either the bracket 174 or 176.

The link 164 also includes the arm portion 170 disposed opposite from the arm portion 168. Attached to the arm portion 170 is a spring 180 which is operable to bias the link 164 in a counterclockwise direction about the shaft 166. The spring 180 is disposed between a shoulder 182 fixedly mounted on the frame of the machine and a shoulder 184 disposed on that arm 170 of the link 164. A suitable nut mechanism 186 is disposed on the arm 170 of the link 164 and is operable to be rotated about the threaded stud 187 with which the shoulder 184 is operatively associated to adjust the pressure which the spring 180 exerts on the arm 170 of the link 164.

The arm 170 also includes a cam follower 188 which is suitably attached thereto by the bolt 190. The cam follower 188 is operable to be engaged by a plurality of cam members 192 which when engaged therewith effect rotation of the link 164 in a clockwise direction about the shaft 166 against the biasing force of the spring 180. The cam members 192 are mounted on a cam holder 194 is supported for rotation with the shaft 198 and the cam holder 194 is rotated in a timed relationship with a flow of the articles through the article processing apparatus. It should be apparent that when the cam members 192 engage with the cam follower 188, the arm 170 of the link 164 will be rotated in a clockwise direction about the shaft 166. Rotation of the link 164 in a clockwise direction against the biasing force of the spring 180 will effect rotation of the shaft 126 or 128 in a clockwise direction via the link 172 and the brackets 174 or 176, respectively. Rotation of the shafts 126 or 128 in a clockwise direction will effect movement of the pinch roller 112 or 114 to their article conveying position. This will, of course, be dependent on whether the link 172 is attached to the brackets 174 or 176 associated with the pinch roller 112 or 114, respectively.

When the cam follower 188 is not engaged with one of the cam members 192 disposed on the cam holder 194, the spring 180 will rotate the link 164 in a counterclockwise direction about the shaft 166. Rotation of the link 164 in a counterclockwise direction by the spring 180 will effect rotation of the shaft 126 or the shaft 128 in a counterclockwise direction depending upon whether the link 172 is attached to the bracket 174 or the bracket 176. Rotation of the shaft 126 or 128 in a counterclockwise direction will effect movement of the roller 112 or 114 respectively to its inactive position. Thus, it should be apparent that the links 164 and 172 will normally effect movement of the roller 112 or 114 to its inactive position, but when a cam 192 engages with the cam follower 188 on the link 164, the roller 112 or 114, which is associated with the link 172, will be moved to its article conveying position.

The plurality of cam 192 are located in a spaced apart relationship on the cam holder 194. Indicia, such as the indicia 200, may be disposed on the cam holder 194 to facilitate in positioning of the cams 192 thereon. During normal operations of the pinch rollers, it is desirable in certain circumstances to move one of the pinch rollers 112 or 114 between its article conveying and its inactive position due to the configuration of the articles to be separated thereby. For example, if the articles to be separated are arranged in transversely extending rows of alternately short and long articles, then it might be desirable to move the pinch roller 112 between its article conveying and its inactive position as the articles pass therealong. The pinch roller 112 would be raised when the long articles are passing between the pinch roller 112 and the conveyor belt 101 and would be lowered when the shorter articles are disposed between the pinch roller 112 and the conveyor unit 101, as will be more fully explained hereinbelow. The cam members 192 would be operable to effect movement of the pinch roller 112 or pinch roller 114 and the sequence of movement would be controlled by the position of the cam members 192 on the cam holder 194.

Since the cam holder 194 rotates about the shaft 198 in a timed relationship to the flow of articles through the apparatus, the position of the cams 192 on the cam holder 194 is directly related to the flow of articles beneath the pinch rollers. The indicia 200 disposed on the cam holder 194 facilitates positioning the cams 192 thereon, and the indicia is directly related to the position of the articles flowing by the rollers. For example, if a sheet of articles is to be separated having a first row of articles having a length of 10 units and a second row of articles having a length of 15 units, then it would be desirable for the pinch roller 112 to be in its article conveying position when the short row of articles having a length of 10 units is disposed between the pinch roller 112 and conveyor 101. Moreover, when the row of longer articles having a length of 15 units is disposed between the pinch roller 112 and the conveyor belt 101 it would be desirable for the pinch roller 112 to be in its inactive position so that a pinch roll does not engage with the row of articles while the trailing edge thereof is still engaged with the conveyor 27 and the pinch roll 150. Thus, a plurality of cam members 192 could be positioned between 0 and 10 units which would correspond to the location of the first row of short articles so as to effect movement of the pinch roller 112 to is article conveying position when the first row of articles passes beneath the pinch roll 112. No cam members would be disposed from the indicia 10 to the indicia 25, which is a space of 15 units which space would correspond to the location of the large articles. This would provide for the pinch roller 112 to be moved to its inactive position under the force of the spring 180 when the longer articles having a 15 unit length are disposed between the pinch roller 112 and the conveyor belt 101.

FIGS. 4–6 schematically illustrate different modes of operation of the means for separating the articles and schematically represent the cartons or articles which are to be separated. FIG. 4 shows the position of the separation unit 26 when it is desired to separate transversely extending rows of cartons which are all of the same length and whose length is longer than the length between the axis of rotation of the pinch rollers 150 and 112. In this operation the roller 112 has been locked into its inactive position and the rest of the pinch rollers 150, 114 and 116 have been locked in their article conveying position. In this mode of operation, the pinch roller 112 will not cooperate with the conveyor unit 100 to effect separation of the transversely extending rows of articles as the roller 112 is in the inactive position. The pinch roller 114, however, is in its article conveying position and will engage with the leading edge 38a of a first row of articles as the trailing edge 38b of that row of articles passes from engagement with the pinch roller 150 and the conveyor unit 27. The pinch roller 150 will cooperate with the conveyor unit 27 to keep the next successive row of articles moving at the speed of the conveyor unit 27 while the pinch roller 114 cooperates with the conveyor unit 100 to speed up the first transversely extending row of articles and break the nicks 31 which connect the first row of articles with the next successive row of articles.

FIG. 5 illustrates the position of the apparatus when the separator unit 26 is utilized to separate successive rows of cartons having a length which is greater than the length between the axis of rotation of the pinch roller 150 and the pinch roller 114. In this configuration, both the pinch rollers 112 and the pinch roller 114 are locked in their inactive positions and the pinch roller 150 and the pinch roller 116 are locked in their article conveying positions. During this mode of operation, the pinch roller 116 will engage with the lead edge 38a of the first transversely extending row of articles when the trailing edge 38b of that row becomes disengaged from the pinch roller 150. This will, of course, speed up that row of articles relative to the next successive row of articles which would still be engaged with the pinch roller 150 and the conveyor means 27 to thereby break the nicks which hold the successive row of articles together.

Cartons having misaligned or offset lead edges have in the past provided great difficulties when it was desired to separate the successive rows of articles. The prior art devices many times skewed the articles by speeding up one side of the article with which the rollers engaged relative to the other side of the article with which the rollers did not engage. This caused skewing of the articles as they were processed and jammed up the apparatus. The present invention enables articles with misaligned lead edges to be separated without skewing. FIG. 6 illustrates the mode of operation of the apparatus when the cartons to be separated have offset lead edges and are of a length which is greater than the distance between the axis of rotation of the pinch roller 150 and the pinch roller 112, but is less than the distance between the axis of rotation of the pinch roller 150 and the pinch roller 116. During this mode of operation, the link 172 has been connected with the bracket 176, associated with the pinch roller 114, and the pinch roller 114 will be moved between its inactive and its article conveying positions. In this type of operation it is desired to have the pinch rollers 114 engaged with the articles after the misaligned lead edges have passed beneath the pinch rollers 114. If the pinch rollers 114 engaged with the offset lead edge of the articles, skewing of the articles could take place. This would be due to the fact that a roller might engage with a projecting portion, such as the projecting portion 171 and thus speed up that side of the articles while the other side of the articles 173 would not be speeded up, to thereby skew the article on the conveyor unit 100. Therefore, to prevent skewing of articles having offset lead edges, the pinch roller 114 will be cammed downwardly by the cams 192 to engage with the articles after the offset lead edges have passed beneath the roller 114. This will enable the rollers 114 to engage with the body 177 of the articles rather than the misaligned lead edges. While only one article is illustrated schematically in a row of articles in FIG. 6, the row of articles could have a plurality of articles having misaligned lead edges therein and a plurality of rollers 114 could extend across a transversely extending row of articles and engage therewith to effect separation of the articles from the next successive row of articles.

If the rows of articles to be separated had misaligned or offset lead edges and had a short length, then the roller 112 could be cammed between its position rather than the roller 114. This would easily be accomplished by attaching the link 172 to the bracket 174 rather than the bracket 176. Moreover, it should be apparent that if the articles to be separated had misaligned lead edges and were very long articles which extended greater than the length between the axis of rotation of the roller 150 and the roller 116, then the roller 116 and the roller 112 could be locked up and the roller 114 could be cammed between its article conveying and its inactive position to thereby engage with the body of the articles and separate the rows of articles as the misaligned flaps on the lead edge of the articles pass beneath the roller 116.

It should be apparent that the hereinabove described apparatus is subject to many different modes of operations and many different configurations and lengths of articles can be separated thereby. This provides a relatively simple and inexpensive design which is operable to separate both long and short articles and to separate articles having lead edges which are offset in the direction of travel. Moreover, on occasion, there are flap problems in that when the article is cut and creased, a flap might be bent slightly downwardly thereon. To prevent stumbling, the pinch roller is kept out of contact with the lead edges of the articles. In situations such as this, where a stumbling problem might exist, the pinch rollers 112 or 114 may be cammed between their inactive and their article conveying positions so as to engage with the articles and effect separation of that row of articles after the flap has passed beneath the roller. This apparatus provides for separation of articles without stumbling problems and without skewing problems that exist when the articles have offset lead edges. Moreover, the versatility of the apparatus enables separation of many different types and lengths of articles.

What we claim is:

1. Apparatus for processing a plurality of articles arranged in rows which extend transverse to the direction of movement of the articles, said apparatus comprising first means for transporting the articles at a first speed, second means for receiving the articles from said first means and conveying the articles at a second speed in excess of said first speed, said second means including a first speed up roller having an article conveying position and an inactive position in which said first speed up roller does not convey articles, means for selectively locking said first speed up roller in said article conveying or said inactive position, operating means for moving said first speed up roller from said inactive position to said article conveying position when said first speed up roller is not locked in either of said positions to engage said first speed up roller with one of the transversely extending rows of articles at about the time that the trailing edge of the one row of articles passes from said first means to thereby speed up the one row of articles relative to the next succeeding row of articles to thereby effect a spacing of the one row of articles relative to the next successive row of articles, said second means further including a second speed up roller spaced from said first speed up roller in the direction of movement of the articles, said second speed up roller having an article conveying position and an inactive position, said operating means including a member connectable with said second speed up roller when said first speed up roller has been locked in said inactive position to thereby provide for movement of said second speed up roller from said inactive position to said article conveying position to engage said second speed up roller with one of the transversely extending rows of articles at about the time that the trailing edge of the row of articles passes from said first means to thereby speed up the row of articles engaged with said second speed up roller relative to the next successive row of articles engaged with said first means to thereby effect spacing of the one row of articles relative to the next successive row of articles, and means for locking said second speed up roller in said article conveying position or said inactive position when said second speed up roller is not connected with said member.

2. Apparatus for processing a plurality of articles as defined in claim 1 wherein said second means further includes conveyor means for receiving the articles from said first means and conveying the articles at a second speed which is in excess of said first speed, said conveyor means being located adjacent to said first and second speed up rollers when said speed up rollers are in said article conveying position so that said speed up rollers may engage with the articles and bias the articles into engagement with said conveyor means to thereby enable the articles that are biased into engagement with said conveyor means to move at the speed of said conveyor means.

3. Apparatus for processing a plurality of articles as defined in claim 2 wherein said operating means for moving said first speed up roller between said positions includes a linkage operatively associated with said first speed up roller for moving said first speed up roller from said inactive position to said article conveying position, a cam follower interconnected with said linkage for moving said linkage to thereby move said first speed up roller, and cam means movable in a timed relationship to the flow of the articles through said second means and engageable with said cam follower to thereby move said cam follower and effect movement of said first roller between its positions.

4. Apparatus for processing a plurality of articles as defined in claim 3 wherein said member is operatively associated with said linkage and connectable with said first speed up roller when said second speed up roller is locked in one of its positions to thereby provide for movement of said first speed up roller from said inactive position to said article conveying position in response to movement of said linkage.

5. Apparatus for processing articles as defined in claim 4 wherein said cam means includes a movable cam holder, and a plurality of cam members mounted on said cam holder for movement therewith, said cam members being movable relative to said cam holder so as to engage with said cam follower and effect selective movement of a speed up roller connected with said member between its positions at variable intervals which are directly related to the position of said cam members on said cam holders to thereby enable said second means to separate successive rows of articles having various lengths and offset lead edges without skewing the articles.

6. Apparatus for processing a plurality of articles arranged in rows which extend transverse to the direction of movement of the articles, said apparatus comprising first means for transporting the articles at a first speed, second means for receiving the articles from said first means and conveying the articles at a second speed in excess of said first speed, said second means including a first speed up roller having an article conveying position and an inactive position in which said first speed up roller does not convey articles, means for selectively locking said first speed up roller in said article conveying or said inactive position, operating means for moving said first speed up roller from said inactive position to said article conveying position when said first speed up roller is not locked in either of said positions to engage said first speed up roller with one of the transversely extending rows of articles at about the time that the trailing edge of the one row of articles passes from said first means to thereby speed up the one row of articles relative to the next succeeding row of articles to thereby effect a spacing of the one row of articles relative to the next successive row of articles, said operating means for moving said first speed up roller including a linkage associated with said first speed up roller, and adjustable cam means operatively associated with said linkage for moving said first speed up roller from said inactive position to said article conveying position, said cam means being movable in a timed relationship with the movement of the articles to effect movement of said first speed up roller from said inactive position to said article conveying position as articles move through said second means.

7. Apparatus for processing a plurality of articles arranged in rows which extend transverse to the direction of movement of the articles, said apparatus comprising first means for transporting the articles at a first speed, second means for receiving the articles from said first means and conveying the articles at a second speed in excess of said first speed, said second means including a first speed up roller having an article conveying position and an inactive position in which said first speed up roller does not convey articles, means for selectively locking said first speed up roller in said article conveying or said inactive position, and operating means for moving said first speed up roller from said inactive position to said article conveying position when said first speed up roller is not locked in either of said positions to engage said first speed up roller with one of the transversely extending rows of articles at about the time that the trailing edge of the one row of articles passes from said first means to thereby speed up the one row of articles relative to the next succeeding row of articles to thereby effect a spacing of the one row of articles relative to the next successive row of articles, said operating means for moving said first speed up roller including an adjustable cam and linkage assembly for moving said first speed up roller from said inactive position to said article conveying position and which is adjustable so as to enable said first speed up roller to be moved to said article conveying position to engage with the body portion of articles having offset lead edges after the offset lead edges have moved past said first speed up roller to thereby prevent skewing of said articles.

* * * * *